United States Patent
Grace et al.

(10) Patent No.: US 7,144,955 B2
(45) Date of Patent: Dec. 5, 2006

(54) ACRYLATE-FUNCTIONAL BLOCKED POLYISOCYANATE RESIN FOR UV/THERMALLY CURABLE COATINGS

(75) Inventors: Scott A. Grace, Moon Township, PA (US); Michael J. Dvorchak, Monroeville, PA (US); Richard R. Roesler, Wexford, PA (US); Dinesh Pethiyagoda, Pittsburgh, PA (US); Michael K. Jeffries, Follansbee, WV (US); Jan Weikard, Odenthal (DE)

(73) Assignees: Bayer MaterialScience LLC, Pittsburgh, PA (US); Bayer MaterialScience AG, Leverkusen (DE)

( * ) Notice: Subject to any disclaimer, the term of this patent is extended or adjusted under 35 U.S.C. 154(b) by 123 days.

(21) Appl. No.: 10/694,107

(22) Filed: Oct. 27, 2003

(65) Prior Publication Data
US 2005/0090620 A1    Apr. 28, 2005

(51) Int. Cl.
C08L 75/12 (2006.01)
C08G 18/73 (2006.01)
C08G 18/75 (2006.01)

(52) U.S. Cl. .................... 525/124; 525/123; 525/125; 525/126; 525/127; 525/131; 528/75; 528/59; 528/69; 524/589; 522/139; 522/140; 522/174

(58) Field of Classification Search ............... 525/124, 525/123, 125, 126, 127, 131; 528/75, 59, 528/69; 524/589; 522/139, 140, 174
See application file for complete search history.

(56) References Cited

U.S. PATENT DOCUMENTS

| 3,664,861 | A | 5/1972 | Okamura et al. | 117/93.31 |
| 4,008,247 | A | 2/1977 | Tucker | 260/308 B |
| 4,342,793 | A | 8/1982 | Skinner et al. | 427/44 |
| 4,485,226 | A | 11/1984 | Noll et al. | 528/45 |
| 5,234,970 | A | 8/1993 | Kyle | 522/96 |
| 5,350,823 | A | 9/1994 | Haeberle et al. | 528/301 |
| 5,908,907 | A | 6/1999 | Desbois et al. | 526/301 |
| 6,617,413 | B1 * | 9/2003 | Bruchmann et al. | 528/75 |
| 6,747,088 | B1 | 6/2004 | Schwalm et al. | 524/507 |

FOREIGN PATENT DOCUMENTS

WO    03/087246 A1    10/2003    ................ 525/123

* cited by examiner

Primary Examiner—James J. Seidleck
Assistant Examiner—Olga Asinovsky
(74) Attorney, Agent, or Firm—Joseph C. Gil

(57) ABSTRACT

Solvent-based, dual cure coatings incorporating thermally curable blocked polyisocyanates, which also contain unsaturated linkages, and a method for preparing these coatings. The unsaturated linkages, such as acrylate groups, can be crosslinked by free-radical mechanisms such as UV curing.

13 Claims, No Drawings

ACRYLATE-FUNCTIONAL BLOCKED POLYISOCYANATE RESIN FOR UV/THERMALLY CURABLE COATINGS

BACKGROUND OF THE INVENTION

The present invention relates to a solvent-based, dual cure coating incorporating thermally curable blocked polyisocyanate resins, which also contain unsaturated linkages.

The hardening of coating compositions containing (meth) acryloyl groups by UV-initiated polymerization which proceeds by a free radical mechanism is a known and industrially established procedure. It is one of the most rapid methods of hardening in coating technology. However, UV-hardening lacquers have certain disadvantages, such as their high volume shrinkage during hardening, which can result in adhesion problems. The high crosslink density which is inherent in the system results in brittleness, lack of flexibility and a lack of impact strength. Also, the hardening of coating compositions containing UV-hardening (meth) acryloyl groups is dependent on the availability of a sufficient dosage of radiation of the appropriate wavelength. Poorly exposed regions suffer from reduced hardening, which results in appreciable losses in surface resistance, and unexposed regions do not harden at all.

Also well known and widely used in industrial practice is the preparation of coatings from aqueous compositions derived from polyisocyanates and compound with isocyanate-reactive groups. Due to the wide choice of reactants, the technical properties of these coatings, such as adhesion, flexibility, impact strength and resistance to weathering, can be varied over a wide range. However, compared with radiation-hardening systems, the hardening of aqueous two-component polyurethane compositions requires a long time, even at elevated temperatures. Another difference is that UV light is not necessary for curing.

Combinations of both types of hardening, i.e., so-called dual cure systems hardening by UV radiation and hardening by polyurethane formation, are also known for solvent-based lacquers. For example, U.S. Pat. No. 4,342,793 describes hardenable resin compositions which contain a radiation-hardenable reactive thinner (low molecular weight esters of acrylic acid), a saturated polyol and a polyisocyanate. Hardening is carried out by irradiation in order to polymerize the reactive thinner, which is followed by thermal hardening to form a polyurethane from the polyol and the polyisocyanate. One-component dual cure coatings are also known (see U.S. Pat. No. 5,234,970).

Dual cure systems have varying processing (e.g. processing speed, pot life and cure conditions) and end use demands (e.g., thermal characteristics, weathering and hydrolytic stability). Accordingly the intended application and the environment related to that application have typically dictated the particular formulation of the coating.

U.S. Pat. No. 5,350,823 discloses the preparation of a self-crosslinkable copolymer of a) monomer prepared by first reacting isophorone diisocyanate (IPDI) with 2-hydroxyethyl acrylate and then with butanone oxime, and b) an usaturated compound. Crosslinking of the copolymer occurs by a single mechanism only.

U.S. Pat. No. 4,485,226 describes a UV-curable composition which is a combination of a) a blocked isocyanate prepared by reacting a portion of the isocyanate groups of an aliphatic isocyanate with butanone oxime and then reacting the rest of the isocyanate groups with hydroxyethylacrylate and b) an isocyanate reactive material (see column 5, lines 19–31). As described therein, after polyurethane formation, the systems are converted to the cross-linked state by high-energy radiation.

U.S. Pat. No. 5,908,907 describes aqueous emulsions from blocked isocyanates wherein a portion of the isocyanate groups of an HDI trimer are blocked with methyl ethyl ketoxime and then the rest of the isocyanate groups are reacted with hydroxyethylacrylate.

U.S. Pat. No. 4,008,247 discloses reacting a portion of the isocyanate groups of an aromatic isocyanate with an hydroxy functional unsaturated monomer and the rest of the isocyanate groups with a blocking agent (including dimethylpyrazole). Ethylenically unsaturated blocked (cyclo)aliphatic diisocyanates are not described.

There remains a need for dual-cure coatings formulations, producing desirable coatings properties, in which blocked (cyclo)aliphatic polyisocyanates are combined in the same molecule with UV cure capabilities.

DESCRIPTION OF THE INVENTION

As used herein, unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range.

The present invention is directed to a non-aqueous, dual-cure composition, its method of preparation and its method of use. The non-aqueous, dual-cure composition comprises:
a) from about 5 to about 85% by weight of a blocked (cyclo)aliphatic polyisocyanate prepared by
   i) reacting a hydroxy-functional (meth)acrylate with an organic (cyclo)aliphatic polyisocyanate at an NCO to OH equivalent ratio of from about 1.5:1 to about 3:1, with the resultant partially blocked isocyanate having an isocyanate group content of from about 5 to about 13% by weight, and
   ii) reacting the remaining isocyanate groups with a blocking agent,
b) from about 5 to about 85% by weight of a hydroxy-functional polymer having an OH number of from about 10 to about 250 and an acid number of from about 0.1 to about 50, with the equivalent ratio of blocked isocyanate groups to hydroxy groups being from about 0.8:1 to about 1.2:1, said hydroxy-functional polymer being selected from the group consisting of saturated polyesters, unsaturated polyesters, and mixtures thereof,
c) from 0 to about 65% of an ethylenically unsaturated compound selected from the group consisting of ethylenically unsaturated monomers, polymers containing ethylenic unsaturation (other than unsaturated polyesters), and mixtures thereof and
d) from about 0.1 to about 7.0% by weight of a UV initiator for free-radical polymerization, with the percentages by weight totaling 100%, and with the proviso that if component b) is a saturated polyester, component c) is present in an amount of from about 20 to about 65% by weight.

The blocked (cyclo)aliphatic polyisocyanate (component a)) is prepared by reacting a hydroxy-functional (meth) acrylate with an organic (cyclo)aliphatic polyisocyanate at an NCO to OH equivalent ratio of from about 1.5:1 to about 3:1, preferably from about 1.8:1 to about 2.2:1, with the resultant partially blocked isocyanate having an isocyanate group content of from about 5 to about 13% by weight, preferably from about 8 to about 13% by weight, and reacting the remaining isocyanate groups with a blocking agent. The dual-cure composition contains from about 5% to about 85%, preferably from about 14 to about 75% by weight of the blocked (cyclo)aliphatic polyisocyanate (component a)).

The unsaturated, hydroxy-functional (meth)acrylates useful in preparing the blocked isocyanate include, for example hydroxy-$C_1$–$C_{10}$-alkyl (meth)acrylates. Specific examples include, 2-hydroxyethyl acrylate, 2-hydroxypropyl acrylate, 2-hydroxyethyl methacrylate, 3- and 4-hydroxybutyl acrylate, 3- and 4-hydroxybutyl methacrylate, 6-hydroxyethyl acrylate, 6-hydroxyethyl methacrylate, 3-hydroxy-2-ethylhexyl acrylate, 3-hydroxy-2-ethylhexyl methacrylate, and, 2-hydroxypropyl methacrylate. Mixtures can also be used. The use of 2-hydroxyethyl acrylate is preferred.

Substantially any aliphatic and/or cycloaliphatic isocyanate may be used. Examples include organic (cyclo)aliphatic polyisocyanates of the general formula $X(NCO)_2$, where X is an aliphatic hydrocarbon radical of 4 to 12 carbon atoms, or a cycloaliphatic hydrocarbon radical of 6 to 15 carbon atoms, may be used according to the present invention. Specific examples of useful isocyanates include, but are not limited to, butane-1,4-diisocyanate, hexane-1,6-diisocyanate, 2,2,4- and 2,4,4-trimethyl-hexamethylene diisocyanate, cyclohexane diisocyanate, isophorone diisocyanate, 1,4-bis (β-isocyanatoethyl) cyclohexane, isophorone diisocyanate, 4,4'-diisocyanatodicyclohexylmethane and hexamethylene diisocyanate. Also useful are isocyanurate-group containing polyisocyanates based on aliphatic and/or cycloaliphatic isocyanates. The production of isocyanurate-group containing polyisocyanates is known in the art and is described, for example, in U.S. Pat. Nos. 4,288,586 and 4,324,879. Also useful are uretdione-containing, biuret-containing and urethane-group containing isocyanates based on aliphatic and/or cycloaliphatic isocyanates. Such isocyanates are known in the coating art. The use of a low viscosity solvent-free polyfunctional aliphatic polyisocyanates based on hexamethylene diisocyanate (such as the resin commercially available from Bayer Polymers LLC as Desmodur N 3600) is preferred.

Blocking agents are known in the coatings art. Examples of useful blocking agents include, but are not limited to, acetone oxime, diethyl ketoxime, methyl isopropyl ketoxime, methyl isobutyl ketoxime, diisopropyl ketoxime, methyl ethyl ketoxime, dimethylpyrazole, malonicacid dimethyl ester, acetoacetic acid ethyl ester, ε-caprolactam, pyrazole and $C_1$ to $C_4$ alkyl pyrazoles. Dimethylpyrazole (DMP) is presently preferred.

In preparing the blocked polyisocyanate (component a)), typically, the (cyclo)aliphatic polyisocyanates are combined with solvent and catalyst, with stirring and heating. The hydroxy-functional (meth)acrylate is added in dropwise fashion to the (cyclo)aliphatic polyisocyanates, with stirring and heating until the desired NCO content is obtained. The temperature is then increased and the blocking agent is added until the NCO peak (as observed through IR spectrophotometry) disappears. The resultant blocked isocyanate contains both blocked isocyanate functionality and ethylenically unsaturated functionality.

The hydroxy-functional polymer (ingredient b)) has an OH number from about 10 to 250. The hydroxy-functional polymer also has an acid number of from about 0.1 to about 50, preferably from about 1 to about 5. The equivalent ratio of blocked isocyanate groups to hydroxy groups in the hydroxy-functional polymer ranges from about 0.8:1 to about 1.2:1, preferably from about 0.9:1 to about 1.1:1. The hydroxy-functional polymer may be a saturated polyester or an unsaturated polyester, or a mixture thereof. Suitable polyesters are known in the polyurethane art. Saturated polyesters are preferred, with linear saturated polyesters being most preferred. The composition contains from about 5% to about 85%, and preferably from about 25% to 86% by weight, of the hydroxy-functional polymer.

The ethylenically unsaturated ingredient (component c)) contains a compound selected from the group consisting of ethylenically unsaturated monomers, polymers containing ethylenic unsaturation (other than unsaturated polyesters) and mixtures thereof. It is preferred that the ethylenically unsaturated ingredient contains two or more ethylenic double bonds. Preferred as the ethylenically unsaturated component are di-(meth)acrylates of glycols containing from 2 to 6 carbon atoms and poly(meth)acrylates of polyols containing from 3 to 4 hydroxyl groups and 3 to 6 carbon atoms. Specific useful di-(meth)acrylates and poly(meth) acrylates include ethyleneglycol diacrylate, 1,3-propanediol diacrylate, 1,4-butanediol diacrylate, 1,6-hexanediol diacrylate, trimethylolpropane triacrylate, pentaerythritol tetraacrylate, and the corresponding di- and polymethacrylates. Also useful are the di-(meth)acrylates of ether-group containing diols and the poly(meth)acrylates of ether-group containing polyols. The presently preferred unsaturated compound is 1,6-hexanediol diacrylate. The composition contains from 0 to about 65% by weight, and preferably from about 10 to about 60% by weight, of the ethylenically unsaturated ingredient. As noted above, if component b) is a saturated polyester, component c) must be present in an amount of from about 20 to about 65% by weight.

As the UV initiator, any of the compounds known in the art for promoting free radical polymerization using conventional ultraviolet light sources may be used in the coating. UV initiators for free-radical polymerization (component d)) include aromatic ketones such as benzophenone and benzoin ethers such as benzoin isobutyl ether. Other useful photointiators are described, e.g., in U.S. Pat. Nos. 4,485,226 and 5,234,970. The presently preferred UV initiator for free-radical polymerization is 1-hydroxy-cyclohexyl phenyl ketone, commercially available from Ciba Specialty Chemicals as Irgacure® 184. The composition contains from about 0.1% to about 7%, preferably from about 0.5% to about 6% of the UV initiator for free-radical polymerization.

Catalysts for promoting the cure of the reaction between the isocyanate groups (of component a)) and the hydroxy groups (of component b)) can also be added. Examples include, for example, the dialkyl tin salts of a long chain fatty acid such as dibutyltin dilaurate.

Other additives that can be used include flow and leveling aids, mar and slip agents, stabilizers, UV absorbers, antioxidants, inorganic and organic pigments, fillers (such as quartz powder, finely divided silica, barite, calcium carbonate, chalk, dolomite and talc), pigment dispersants and the like.

Coatings may be prepared by combining ingredients a), b), c), and d), to produce a formulation, applying the formulation to a surface to be coated, and curing the resulting formulation. Two curing processes are used: a baking or thermal cure and a UV cure. The curing processes may be performed in either order. For the thermal cure, the coating is typically heated to a temperature of from about 200 to about 750° F. for a period of from about 10 seconds to about 30 minutes. Suitable UV radiation sources are known in the art and include artificial radiation sources emitting in the range of from about 250 to about 500 nm and preferably in the range of from about 300 to about 400 nm. Mercury vapor, xenon and tungsten lamps may be used. While the total dose of radiation depends upon the thickness of the film applied, generally it amounts to between from about 2000 to about 3000 mJ/cm$^2$.

In the examples, all figures cited in percent or in parts represent percentages by weight and parts by weight, respectively, unless otherwise indicated.

EXAMPLES

Example 1

Preparation of Blocked Polyisocyanate Acrylate 1

Into a two liter flask fitted with stirrer, heater, air inlet, distillation column and addition funnel was combined 618.35 g (3.39 eq) of Desmodur N-3600 (a polyfunctional aliphatic polyisocyanate resin based on hexamethylene diisocyanate (HDI), available from Bayer Polymers LLC, having an NCO content of 23.0% by weight) and 240.16 g of N-methyl-pyrolidone. Air was bubbled below the surface of the liquid, and nitrogen gas purged above the liquid surface. To this, 0.97 g of 2,6-di-tert-butyl-4-methylphenol (BHT) and 0.003 g of dibutyltindilaurate was added with stirring and the mixture heated to 60° C. Dropwise addition of 129.52 g (1.11 eq) of 2-hydroxyethylacrylate was made while the temperature was maintained between 60 to 70° C. A reaction temperature of 60° C. was maintained until the mixture reached the theoretical NCO content of 9.34%. The temperature was then increased to 100° C., and slow addition of 215.76 g (2.22 eq) of 3,5-dimethylpyrazole was started while the temperature was maintained at 100° C. The reaction was checked for completion by monitoring the disappearance of the NCO peak (2263–2275 cm$^{-1}$) by IR spectrophotometry. The product was cooled to room temperature and poured into a 1 liter aluminum bullet container sealed under a head of dry air. The resin properties are summarized in Table 1 below:

TABLE 1

| | |
|---|---|
| Solids Content | 80% by weight |
| Viscosity, 25° C. | 12,700 cps |
| Density | 9.4 lbs/gal |
| Blocked Isocyanate Content | 7.74% by weight |
| Blocked Isocyanate Equivalent Weight | 543 |

Example 2

Preparation of Blocked Polyisocyanate Acrylate 2

Into a two liter flask fitted with stirrer, heater, air inlet and distillation column was combined 581.4 g (1.72 eq) of the reaction product of Desmodur N-3600 and hydroxyethyacrylate having an NCO content of 12.8% and a viscosity at 23° C. of 12,500 cps and 250.0 g of n-butyl acetate. A nitrogen pad was maintained on top of the condenser while stepwise addition of 168.6 g (1.76 eq) of 3,5-dimethylpyrazole was begun, and while a temperature of less than 50° C. was maintained. After addition of all of the 3,5-dimethylpyrazole, the reaction mixture was maintained at a temperature of 50° C., until the NCO content was less than 0.05% by titration. The product was cooled to room temperature and poured into a 1 liter aluminum bullet container sealed under a head of dry air. The resin properties were as summarized in Table 2 below:

TABLE 2

| | |
|---|---|
| Solids Content | 75% by weight |
| Viscosity, 25° C. | 820 cps |
| Density | 9.0 lbs/gal |
| Blocked Isocyanate Content | 7.23% by weight |
| Blocked Isocyanate Equivalent Weight | 581 |

Example 3 through 10

Formulation and Testing

Formulations prepared according to the present invention were cured and tested. The formulations were prepared to produce a final NCO/OH ratio of 1.0:1.0. A Byrd applicator draw down bar with a 4 mil gap was used to apply the coating to glass. The dry film thickness was from 1.5 to 2 mils. The cure was achieved by two different procedures. In one case (A), the UV cure was done first followed by oven bake; in the other case (B), the oven bake was done first, followed by UV cure. Cure schedule (A) called for UV curing (10 fpm\100% power using Fusion UV Systems conveyor unit and "H"-bulbs) followed by baking at 260° F. for 30 minutes. Cure schedule (B) called for baking at 260° F. for 30 minutes followed by UV curing (10 fpm\100% power using Fusion UV Systems conveyor unit and "H"-bulbs). The UV curing accounted for approximately 2000–3000 mJ/cm$^2$.

Examples 3, 4, 7 and 8 are comparative examples (since the hydroxy-functional polymer was a saturated polyester and no ethylenically unsaturated compound was added). The formulations used were as set forth in Tables 3 and 4, and the materials were as follows:

Polyester A—a saturated polyester prepared from phthalic acid, adipic acid and trimethylolpropane. Polyester A was used as 75% by weight solids in propylene glycol monomethyl ether acetate. The polyester has an OH number of 210 and an acid number of 3.

Polyester B—a linear, saturated polyester prepared from adipic acid, ethylene glycol and diethylene glycol. The polyester has an OH number of 56 and an acid number of 2.

1,6-HDDA—1,6-hexanediol diacrylate

IR-184—Irgacure 184—1-hydroxycyclohexylphenyl ketone, available from Ciba Specialty Chemicals BA—butyl acetate BLA1—the blocked polyisocyanate acrylate of Example 1

TABLE 3

| | | 3 | 4 | 5 | 6 |
|---|---|---|---|---|---|
| Formulations | Polyester A, pbw | 50 | | 50 | |
| | Polyester B, pbw | | 50 | | 50 |
| | 1,6-HDDA, pbw | | | 54 | 54 |
| | IR-184, pbw | 2.67 | 2.05 | 4.65 | 3.66 |
| | BLA1, pbw | 68.59 | 18.3 | 68.59 | 18.3 |
| | BA, pbw | 20 | 10 | | |

TABLE 4

| Formulations | | 7 | 8 | 9 | 10 |
|---|---|---|---|---|---|
| | Polyester A, pbw | 50 | | 50 | |
| | Polyester B, pbw | | 50 | | 50 |
| | 1,6-HDDA, pbw | | | 54 | 54 |
| | IR-184, pbw | 5.34 | 4.1 | 9.3 | 7.32 |
| | BLA1, pbw | 68.59 | 18.3 | 68.59 | 18.3 |
| | BA, pbw | | 20 | | 10 |

The coatings were tested for chemical resistance and hardness. The chemical resistance was a methylethyl ketone resistance test. This test was performed using an 8"×8" cheesecloth and a 2-pound ball peen hammer. The dry film thickness of the coating was measured and the coated panel was wiped off with a cloth to remove any loose materials. The coated panel was then placed on a flat surface with the painted side up. The ball peen was securely wrapped with several layers of cloth (8"×8" cloth folded twice). The cloth was secured to the hammer by using a rubber band to insure that the cloth did not come off during test. The cheesecloth was saturated with methylethyl ketone. The wet ball peen was placed on the coated surface, with the hammer being held so that the ball peen was at a 90-degree angle to the panel. Without applying downward pressure, the hammer was moved back and forth over an approximately 4" long area of the coating. One forward and back motion was counted as 1 double rub. The cloth was saturated with MEK after every 25 double rubs. The test was stopped if breakthrough of the coating occurred, with the number of double rubs being recorded. Hardness was tested according to ASTM-D4366-95. The results of both tests were as set forth in Table 5. In the Table, DR represents the number of double rubs recorded and Pi representing the initial pendulum hardness in seconds.

TABLE 5

| Cure schedule | | Example # | | | | | | | |
|---|---|---|---|---|---|---|---|---|---|
| | | 3 | 4 | 5 | 6 | 7 | 8 | 9 | 10 |
| A | DR | 21 | 2 | >100 | 41 | 40 | 6 | >100 | 30 |
| B | DR | 30 | 30 | 80 | 45 | 46 | 10 | 62 | 13 |
| A | PI | 101 | 19 tacky | 122 | 22 tacky | 106 | 27 tacky | 75 | 21 tacky |
| B | PI | 40 | 18 tacky | 50 | 37 | 62 | 15 tacky | 67 | 34 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A non-aqueous, dual-cure composition comprising:
    a) from about 5 to about 85% by weight of a blocked (cyclo)aliphatic polyisocyanate prepared by
        i) reacting a hydroxy-functional (meth)acrylate with an organic (cyclo)aliphatic polyisocyanate with an NCO to OH equivalent ratio of from about 1.5:1 to about 3:1, with the resultant partially blocked isocyanate having an isocyanate group content of from about 5 to about 13% by weight, and wherein said organic polyisocyanate is selected from the group consisting of uretdione-containing, biuret-containing, isocyanurate-containing and urethane-group, containing polyisocyanates, and
        ii) reacting the remaining isocyanate groups with a blocking agent,
    b) from about 5 to about 85% by weight of a hydroxy-functional polymer having an OH number of from about 10 to about 250 and an acid number of from about 0.1 to about 50, with the equivalent ratio of blocked isocyanate groups to hydroxy groups being from about 0.8:1 to about 1.2:1, said hydroxy-functional polymer being selected from the group consisting of saturated polyesters, unsaturated polyesters, and mixtures thereof,
    c) from 0 to about 65% of an ethylenically unsaturated compound selected from the group consisting of ethylenically unsaturated monomers, polymers containing ethylenic unsaturation (other than unsaturated polyesters), and mixtures thereof and
    d) from about 0.1 to about 7.0% by weight of a UV initiator for free-radical polymerization,
    said percentages by weight totaling 100%, and with the proviso that if ingredient b) is a saturated polyester, ingredient c) is present in an amount of from about 20 to about 65% by weight.

2. The composition of claim 1, wherein the hydroxy-functional polymer comprises a saturated polyester.

3. The composition of claim 1, wherein the ethylenically unsaturated compound comprises an alkanediol diacrylate.

4. The composition of claim 1, wherein the ethylenically unsaturated compound comprises 1,6-hexanediol diacrylate.

5. The composition of claim 1, wherein the blocking agent comprises dimethylpyrazole (DMP).

6. A process for preparing a coated substrate comprising
    a) mixing:
        i) from about 5 to about 85% by weight of a blocked (cyclo)aliphatic polyisocyanate prepared by
            A) reacting a hydroxy-functional (meth)acrylate with an organic (cyclo)aliphatic polyisocyanate at an NCO to OH equivalent ratio of from about 1.5:1 to about 3:1, with the resultant partially blocked isocyanate having an isocyanate group content of from about 5 to about 13% by weight, and wherein said organic polyisocyanate is selected from the group consisting of uretdione-containing, biuret-containing, isocyanurate-containing and urethane-group containing polyisocyanates, and
            B) reacting the remaining isocyanate groups with a blocking agent,
        ii) from about 5 to about 85% by weight of a hydroxy-functional polymer having an OH number of from about 10 to about 250 and an acid number of from about 0.1 to about 50, with the equivalent ratio of blocked isocyanate groups to hydroxy groups being from about 0.8:1 to about 1.2:1, said hydroxy-functional polymer being selected from the group consisting of saturated polyesters, unsaturated polyesters, and mixtures thereof,
        iii) from 0 to about 65% of an ethylenically unsaturated compound selected from the group consisting of ethylenically unsaturated monomers, polymers containing ethylenic unsaturation (other than unsaturated polyesters), and mixtures thereof and
        iv) from about 0.1 to about 7.0% by weight of a UV initiator for free-radical polymerization, said percentages by weight totaling 100%, and with the proviso that if ingredient ii) is a saturated polyester, ingredient iii) is present in an amount of from about 20 to about 65% by weight, b) applying the resultant composition to said substrate, and c) curing the composition, by UV curing and thermal curing, to form the coating.

7. The method of claim 6, wherein the UV curing is performed before thermal curing.

8. The method of claim 6, wherein the thermal curing is performed before UV curing.

9. A coated substrate comprising a substrate having applied thereto a coating produced by a) mixing:
  i) from about 5 to about 85% by weight of a blocked (cyclo)aliphatic polyisocyanate prepared by
    A) reacting a hydroxy-functional (meth)acrylate with an organic (cyclo)aliphatic polyisocyanate at an NCO to OH equivalent ratio of from about 1.5:1 to about 3:1, with the resultant partially blocked isocyanate having an isocyanate group content of from about 5 to about 13% by weight, and wherein said organic polyisocyanate is selected from the group consisting of uretdione-containing, biuret-containing, isocyanurate-containing and urethane-group containing polyisocyanates, and
    B) reacting the remaining isocyanate groups with a blocking agent,
  ii) from about 5 to about 85% by weight of a hydroxy-functional polymer having an OH number of from about 10 to about 250 and an acid number of from about 0.1 to about 50, with the equivalent ratio of blocked isocyanate groups to hydroxy groups being from about 0.8:1 to about 1.2:1, said hydroxy-functional polymer being selected from the group consisting of saturated polyesters, unsaturated polyesters, and mixtures thereof,
  iii) from 0 to about 65% of an ethylenically unsaturated compound selected from the group consisting of ethylenically unsaturated monomers, polymers containing ethylenic unsaturation (other than unsaturated polyesters), and mixtures thereof and
  iv) from about 0.1 to about 7.0% by weight of a UV initiator for free-radical polymerization,
  said percentages by weight totaling 100%, and with the proviso that if ingredient ii) is a saturated polyester, ingredient iii) is present in an amount of from about 20 to about 65% by weight, b) applying the resultant composition to said substrate, and c) curing the composition, by UV curing and thermal curing, to form the coating.

10. The composition of claim 1, wherein said organic polyisocyanate is a uretdione-containing polyisocyanate.

11. The composition of claim 1, wherein said organic polyisocyanate is a biuret-containing polyisocyanate.

12. The composition of claim 1, wherein said organic polyisocyanate is an isocyanurate-containing polyisocyanate.

13. The composition of claim 1, wherein said organic polyisocyanate is a urethane-group-containing polyisocyanate.

* * * * *